US012733584B2

(12) United States Patent
Shearer et al.

(10) Patent No.: US 12,733,584 B2
(45) Date of Patent: Sep. 15, 2026

(54) SYSTEMS AND METHODS FOR SETTING HEADER CUT HEIGHT

(71) Applicant: MACDON INDUSTRIES LTD, Winnipeg (CA)

(72) Inventors: Bruce Shearer, Winnipeg (CA); Andrew Bell, Sanford (CA); James Dunn, Winnipeg (CA)

(73) Assignee: MACDON INDUSTRIES LTD, Winnipeg (CA)

( * ) Notice: Subject to any disclaimer, the term of this patent is extended or adjusted under 35 U.S.C. 154(b) by 289 days.

(21) Appl. No.: 18/682,933

(22) PCT Filed: Sep. 6, 2022

(86) PCT No.: PCT/CA2022/051334

§ 371 (c)(1),
(2) Date: Feb. 12, 2024

(87) PCT Pub. No.: WO2023/035064

PCT Pub. Date: Mar. 16, 2023

(65) Prior Publication Data

US 2024/0349645 A1 Oct. 24, 2024

Related U.S. Application Data

(60) Provisional application No. 63/242,589, filed on Sep. 10, 2021.

(51) Int. Cl.
*A01D 41/14* (2006.01)

(52) U.S. Cl.
CPC .................................. *A01D 41/141* (2013.01)

(58) Field of Classification Search
CPC .................................................... A01D 41/141
USPC ....................................................... 56/10.2 R
See application file for complete search history.

(56) References Cited

U.S. PATENT DOCUMENTS 5,704,200 A * 1/1998 Chmielewski, Jr. ......................... A01D 41/141 56/DIG. 15
2009/0255248 A1 10/2009 Bitter
2014/0237980 A1 8/2014 Verhaeghe et al.
2015/0271999 A1* 10/2015 Enns .................... A01D 41/145 700/275
2018/0070531 A1 3/2018 Long et al.
2019/0335661 A1 11/2019 Seiders, Jr.
2020/0163277 A1 5/2020 Cooksey et al.
2022/0007578 A1* 1/2022 Trowbridge ......... A01D 41/145

* cited by examiner

*Primary Examiner* — Mahmoud S Ismail
(74) *Attorney, Agent, or Firm* — Miller Canfield

(57) ABSTRACT

A method for controlling header cut height on a combine. The combine includes an adapter, a header pivotably mounted to the adapter, a cutter bar assembly operatively extending across a front portion of the header, and a gauge wheel pivotably coupled to the header. The method comprising the steps of receiving a request to adjust a height of the cutter bar assembly, determining whether a position of a first cylinder is greater than a value, and if it is determined that the position of the first cylinder is greater than the value, using the first cylinder to adjust the height of the cutter bar assembly.

21 Claims, 6 Drawing Sheets

10
12
14
16
18
20
22
24
26
28
30
32
34
36
38
40
42
44
46
48
50
52
54
56
58

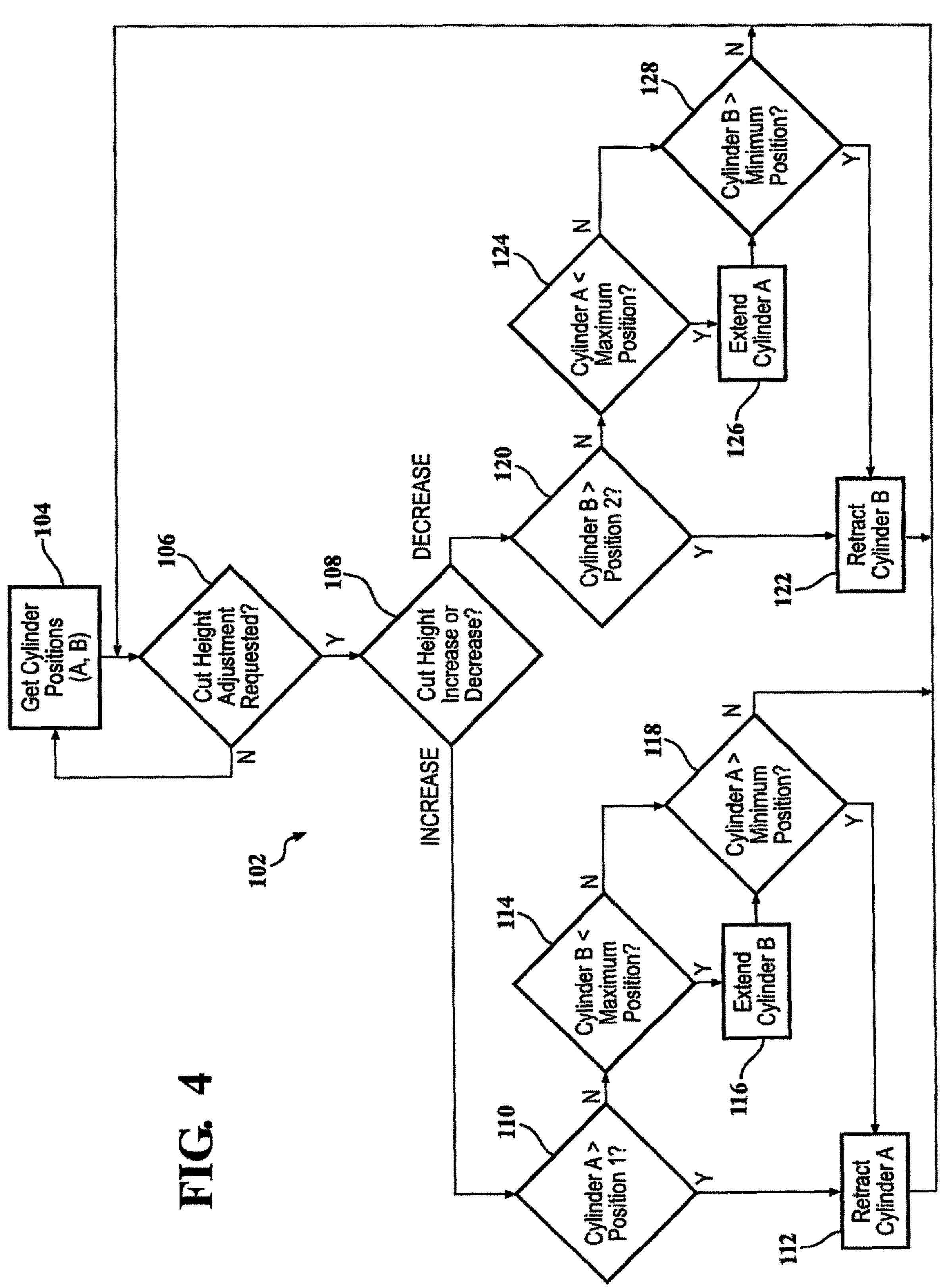
FIG. 4
102
104
Get Cylinder Positions (A, B)
106
Cut Height Adjustment Requested?
N
Y
108
Cut Height Increase or Decrease?
INCREASE
DECREASE
110
Cylinder A > Position 1?
Y
N
112
Retract Cylinder A
114
Cylinder B < Maximum Position?
Y
N
116
Extend Cylinder B
118
Cylinder A > Minimum Position?
Y
N
120
Cylinder B > Position 2?
Y
N
122
Retract Cylinder B
124
Cylinder A < Maximum Position?
Y
N
126
Extend Cylinder A
128
Cylinder B > Minimum Position?
Y
N 130
Get Cylinder Positions (A, B)
132
Cut Height Adjustment Requested?
134
N
Y
Cut Height Increase or Decrease?
136
INCREASE
DECREASE
Cylinder A > Minimum Position?
138
N
Y
Retract Cylinder A
140
Cylinder B < Maximum Position?
142
N
Y
Extend Cylinder B
144
Cylinder B > Minimum Position?
146
N
Y
Retract Cylinder B
148
Cylinder A < Maximum Position?
150
N
Y
Extend Cylinder A
152

SYSTEMS AND METHODS FOR SETTING HEADER CUT HEIGHT

CROSS-REFERENCE TO RELATED APPLICATIONS

This application claims priority to U.S. provisional patent application No. 63/242,589, filed Sep. 10, 2021, which is incorporated herein by reference.

TECHNICAL FIELD

The present invention relates to systems and methods for controlling the height and pitch of a header on a combine harvester.

BACKGROUND OF THE INVENTION

Combines for harvesting a variety of crop from a field are generally known in the art. Combines include headers mounted in front of a feederhouse. The headers include a cutter bar assembly to cut crop material from the field, and a draper belt assembly positioned behind the cutter bar assembly to transport crop material into the feederhouse. A variety of cylinders may be used to adjust the height of the cutter bar assembly. For example, a gauge wheel cylinder may extend or retract gauge wheels on the header to adjust the height of the cutter bar assembly when cutting above the ground. Similarly, a skid shoe cylinder may extend or retract skid shoes on the header to adjust the height of the cutter bar assembly when cutting close to the ground. A header tilt cylinder and/or a faceplate cylinder also may control the pitch of the header relative to the ground during the cutting action.

Currently, separate buttons control the header angle, the gauge wheels, and the skid shoe height. All of these functions are used for setting stubble height of cut crop in different ranges. For example, when approaching a lodged crop, multiple button pushes are required because it is necessary to switch between different methods of controlling stubble height. Also, when cutting with the cutter bar assembly off the ground, it is beneficial to have the header at a flat angle to improve crop flow. Conversely, it is beneficial to have the header operating at a steeper angle if the crop is lodged. It is desirable to have a simple system for operators to set stubble height while cutting crop.

SUMMARY OF THE INVENTION

The present invention is directed to a system and method for using a single button to control the height and pitch of a header in a combine harvester when using ground contacting height control. Various parameters, such as hydraulic header tilt, faceplate tilt, gauge wheels, and hydraulic long and short skid shoes, may be used to control the stubble height. Generally low stubble heights are controlled with header tilt functions, and taller stubble height are controlled with gauge wheels. An operator uses different buttons to control these parameters. The present invention uses one up/down button to control all of these parameters by sequencing the activation of various cylinders, simultaneously and/or in parallel, to optimize crop harvesting.

According to one aspect of the invention, a method is provided for controlling header cut height on a combine. The combine includes an adapter, a header pivotably mounted to the adapter, a cutter bar assembly operatively extending across a front portion of the header, and a gauge wheel pivotably coupled to the header. The method comprising the steps of receiving a request to adjust a height of the cutter bar assembly, determining whether a position of a first cylinder is greater than a value, and if it is determined that the position of the first cylinder is greater than the value, using the first cylinder to adjust the height of the cutter bar assembly.

According to another aspect of the invention, a system is provided for controlling header cut height on a combine. The combine includes an adapter, a header pivotably mounted to the adapter, a cutter bar assembly operatively extending across a front portion of the header, a gauge wheel pivotably coupled to the header, and a plurality of cylinders, wherein each of the plurality of cylinders is adapted to adjust a height of the cutter bar assembly. The system comprises a monitoring device, a control unit adapted to extend and retract each of the plurality of cylinders and a processor adapted to process information from the monitoring device and provide instructions to the control unit. If the monitoring device receives a request to adjust the height of the cutter bar assembly, the processor determines whether a position of a first of the plurality of cylinders is greater than a value. If the processor determines that the position of the first of the plurality of cylinders is greater than the value, the control unit uses the first of the plurality of cylinders to adjust the height of the cutter bar assembly.

According to another aspect of the invention, a combine is provided for harvesting agricultural crops. The combine comprises an adapter, a header pivotably mounted to the adapter, a cutter bar assembly operatively extending across a front portion of the header, a gauge wheel pivotably coupled to the header, a plurality of cylinders, wherein each of the plurality of cylinders is adapted to adjust a height of the cutter bar assembly, and a system for extending and retracting each of the plurality of cylinders. If the system receives a request to adjust a height of the cutter bar assembly, the system determines whether a position of a first of the plurality of cylinders is greater than a value. If the system determines that the position of the first of the plurality of cylinders is greater than the value, the system uses the first of the plurality of cylinders to adjust the height of the cutter bar assembly.

BRIEF DESCRIPTION OF THE DRAWINGS

Advantages of the present invention will be readily appreciated as the same becomes better understood by reference to the following detailed description when considered in connection with the accompanying drawings wherein:

FIG. 4 is a flow diagram illustrating an exemplary method for controlling the header height and pitch on a combine harvester according to a second embodiment of the present invention;

DETAILED DESCRIPTION OF EXAMPLE EMBODIMENTS

Figure 1:
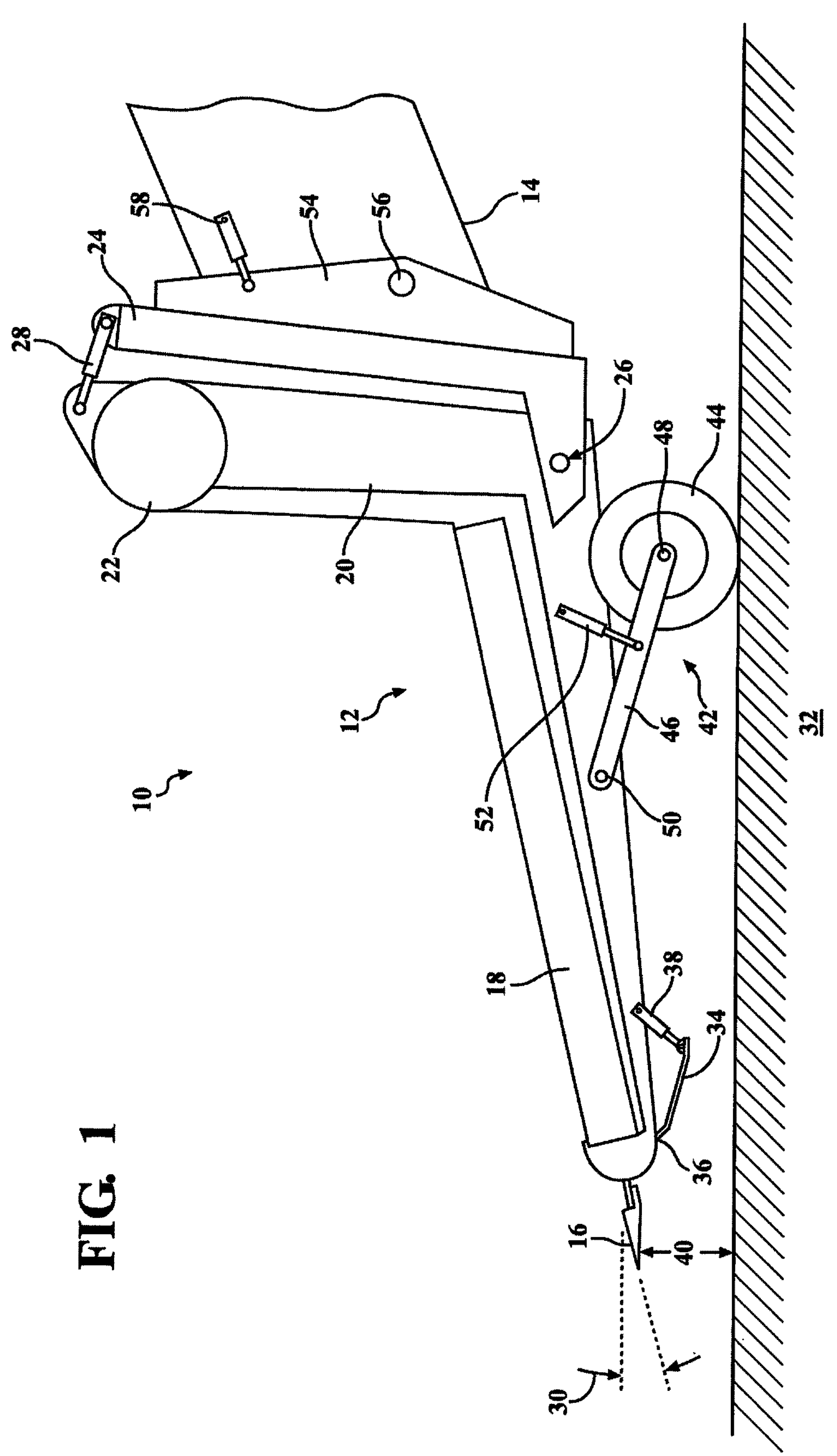
FIG. 1 is a cross-sectional side view of a header on a combine harvester according to embodiments of the present invention.

FIG. 1 illustrates a combine harvester 10 according to embodiments of the present invention. The combine 10 includes a header 12 mounted on a feederhouse 14. The header 12 includes a cutter bar assembly 16 operatively extending across a front portion of the header 12 to cut crop material from the field, and a draper belt assembly 18 positioned behind the cutter bar assembly 16 to transport the crop material into the feederhouse 14. The draper belt assembly 18 is supported by a forwardly extending arm 20 mounted on a main rear beam 22. The forwardly extending arm 20 is pivotably mounted to an adapter 24 about pivot 26. A header tilt cylinder 28 may be used to control the pitch angle of the header 12 relative to the adapter 24, thereby adjusting the cut angle 30 of the cutter bar assembly 16 relative to ground 32.

A skid shoe 34 is pivotably connected to the header 12 behind the cutter bar assembly 16 at pivot 36. The skid shoe 34 supports the header 12 when cutting crop close to the ground 32. A skid shoe cylinder 38 may be used to extend and retract the skid shoe 34 to adjust the cut height 40 of the cutter bar assembly 16.

A gauge wheel 42 is pivotably connected to the header 12 below the draper belt assembly 18. The gauge wheel 42 includes a wheel 44 rotatably connected to a pivot arm 46 about an axis 48. The pivot arm 46 is pivotably connected to the header 12 at pivot 50. A gauge wheel cylinder 52 may be used to extend and retract the gauge wheel 42. In the extended position, the gauge wheel 42 supports the header 12 when cutting above ground 32.

A front face plate 54 is connected to the adapter 24 and is pivotably mounted on the feederhouse 14 at pivot 56. A face plate cylinder 58 may be used to control the pitch angle of the front face plate 54, and thus the pitch angle of the header 12, relative to the feederhouse 14 thereby adjusting the cut angle 30 of the cutter bar assembly 16 relative to ground 32.

With conventional combines, the operator is required to adjust separate controls for each of the head tilt cylinder 28, the skid shoe cylinder 38, the gauge wheel cylinder 52 and the face plate cylinder 58. Thus, when changing the cut height, the operator needs to decide which cylinder 28, 38, 52, 58 to adjust in order to obtain the desired cut height 40 and angle 30. In order to reduce the complexity of operating multiple up/down buttons, the present invention provides a system 60 for sequencing the operation of the cylinders 28, 38, 52, 58 to raise and lower the cut height 40 of the cutter bar assembly 16 using one up/down button. The present invention also automatically sets the header 12 at the recommended cut angle 30 for best performance. For example, when cutting bulky crops with the cutter bar assembly 16 off the ground 32, the system 60 automatically adjusts the header 12 to a flat angle for better crop flow into the feederhouse 14. The sequencing provided by the present invention could be performed mechanically or using software. Position sensors are provided for each cylinder 28, 38, 52, 58. The cylinders 28, 38, 52, 58 could be controlled serially or in parallel, or by a combination of serial and parallel control. In addition, the system 60 may disable one or more of the cylinders 28, 38, 52, 58, e.g., the skid shoe cylinder 38 may be in the retracted position at all times. The present invention is independent of the feederhouse up/down button.

The present invention may be used to cut crops in auto header height control mode ("AHHC"), which uses a sensor (e.g., a wheel, dongle, float spring, etc.) to determine the height of the header 12 and adjusts the feederhouse cylinders to achieve that height target. The present invention also may be used with presets, which remember certain positions of some or all of the cylinders 28, 38, 52, 58, including reel positions, and adjusts to them.

Figure 2:
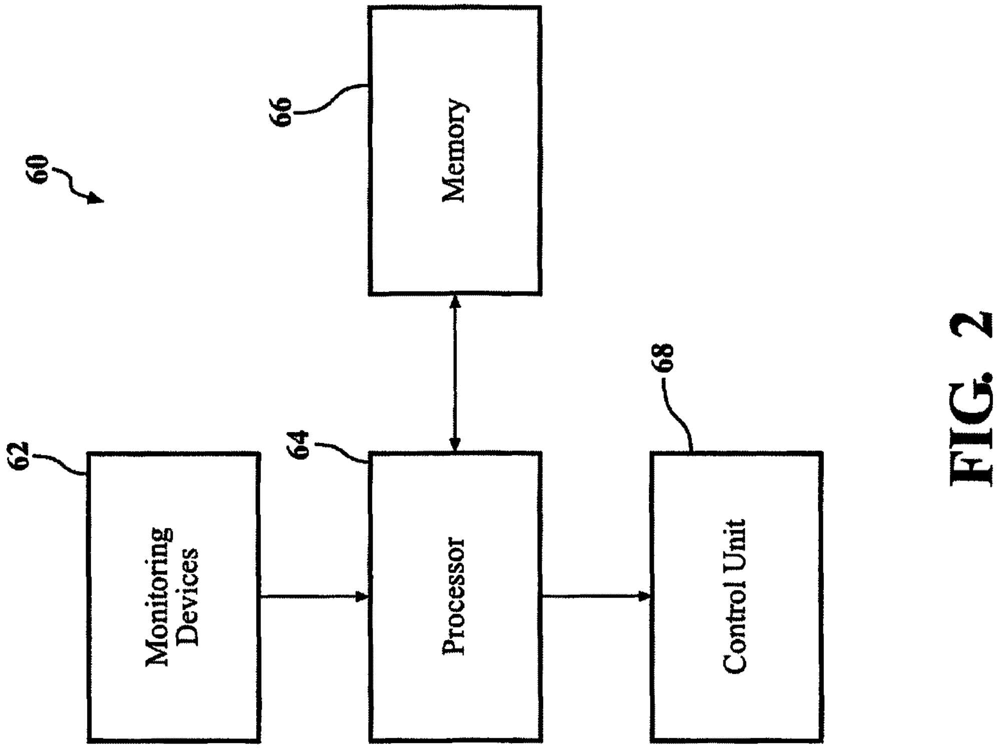
FIG. 2 illustrates an exemplary system for adjusting the cut height of the header according to embodiments of the present invention.

FIG. 2 illustrates an exemplary system 60 for adjusting the cut height 40 of the cutter bar assembly 16. The system 60 includes monitoring devices 62, a processor 64, memory 66 and one or more control units 68. The monitoring devices 62 include the position sensors for each of the cylinders 28, 38, 52, 58 and sensors to determine when the up/down button is in the tilt retract or the tilt extend position. The processor 64 processes the information from the monitoring devices 62 and uses that information to instruct the control units 68 to control the operation of the cylinders 28, 38, 52, 58.

Figure 3:
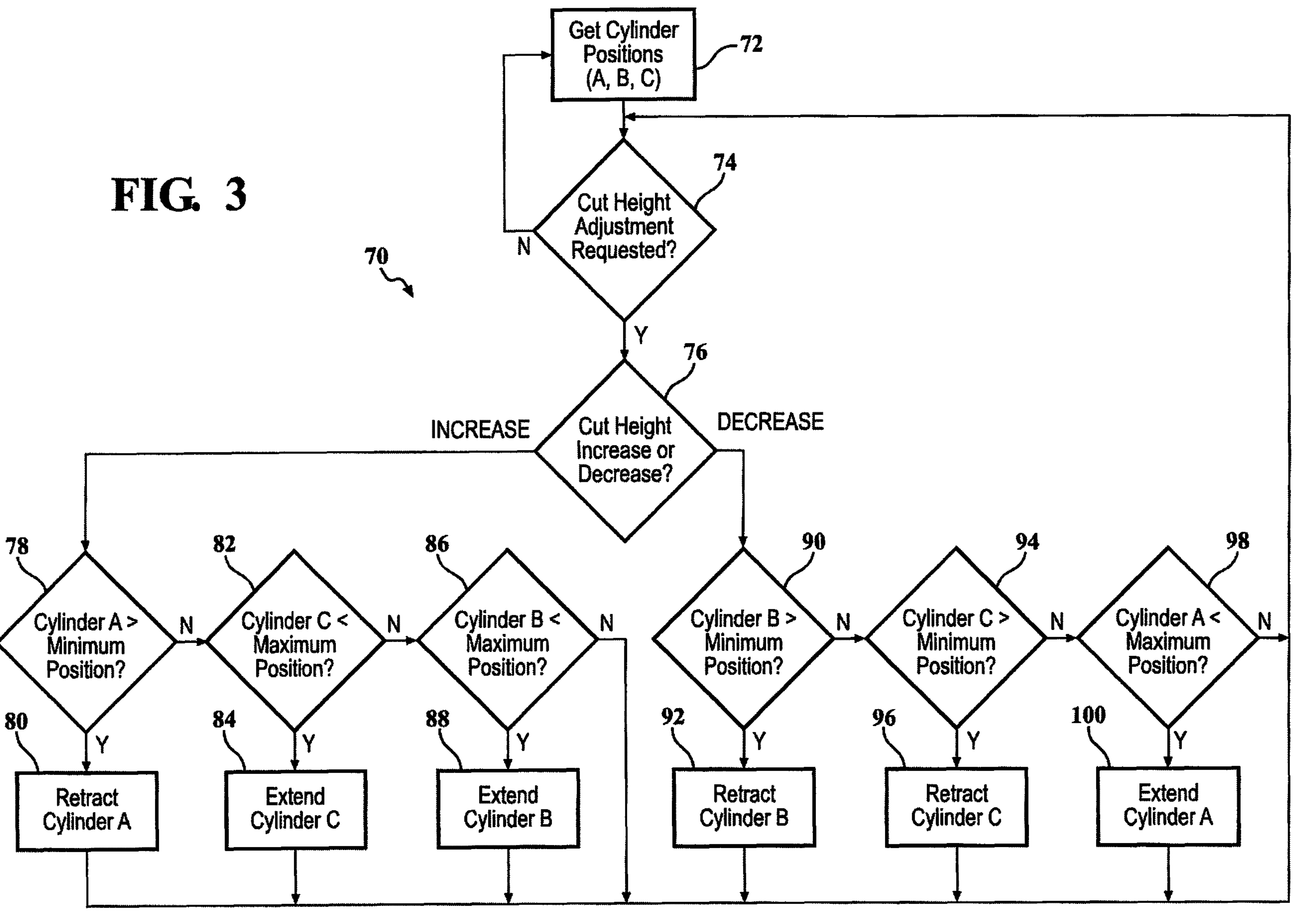
FIG. 3 is a flow diagram illustrating an exemplary method for controlling the header height and pitch on a combine harvester according to a first embodiment of the present invention.

FIG. 3 illustrates an exemplary method 70 performed by the system 60 in accordance with a first embodiment of the present invention for automatically controlling various height/pitch cylinders on a combine 10 when an operator requests a height adjustment for the cutter bar assembly 16. In the Figures, cylinder A represents the head tilt cylinder 28, cylinder B represents the gauge wheel cylinder 52, and cylinder C represents the skid shoe cylinder 38. Although the face plate cylinder 58 is not depicted in the method 70, the face plate cylinder 58 may replace the head tilt cylinder 28 in the method 70, or may be used in conjunction with the head tilt cylinder 28 in the method 70.

After determining the position of each of the cylinders (step 72), the system 60 waits to receive a height adjustment request from the operator (step 74). If the system 60 receives a height adjustment request from the operator, the system 60 determines whether the height adjustment request is a request to increase or decrease the crop cut height (step 76). If the request is to increase the crop cut height, the system 60 determines whether cylinder A is greater than its minimum position (step 78). If cylinder A is greater than its minimum position, the system 60 retracts cylinder A (step 80) to increase the crop cut height and returns to step 74 to determine whether the operator continues to request a height adjustment. If cylinder A is not greater than its minimum position, the system 60 determines whether cylinder C is less than its maximum position (step 82). If cylinder C is less than its maximum position, the system 60 extends cylinder C (step 84) to increase the crop cut height and returns to step 74 to determine whether the operator continues to request a height adjustment. If cylinder C is not less than its maximum position, the system 60 determines whether cylinder B is less than its maximum position (step 86). If cylinder B is less than its maximum position, the system 60 extends cylinder B (step 88) to increase the crop cut height and returns to step 74 to determine whether the operator continues to request a height adjustment. If cylinder B is not less than its maximum position, the cutter bar assembly 18 has reached its maximum controlled cut height, and the system 60 returns to step 74 to await another height adjustment request from the operator.

If, at step 76, the request is to decrease the crop cut height, the system 60 determines whether cylinder B is greater than its minimum position (step 90). If cylinder B is greater than its minimum position, the system 60 retracts cylinder B (step 92) to decrease the crop cut height and returns to step 74 to determine whether the operator continues to request a height adjustment. If cylinder B is not greater than its minimum position, the system 60 determines whether cylinder C is greater than its minimum position (step 94). If cylinder C is greater than its minimum position, then the system 60 retracts cylinder C (step 96) to decrease the crop cut height and returns to step 74 to determine whether the operator continues to request a height adjustment. If cylinder C is not greater than its minimum position, then the system 60 determines whether cylinder A is less than its maximum position (step 98). If cylinder A is less than its maximum position, then the system 60 extends cylinder A (step 100) to decrease the crop cut height and returns to step 74 to determine whether the operator continues to request a height adjustment. If cylinder A is not less than its maximum position, the cutter bar assembly 16 has reached its minimum controlled cut height, and the system 60 returns to step 74 to await another height adjustment request from the operator.

FIG. 4 illustrates an exemplary method 102 performed by the system 60 in accordance with a second embodiment of the present invention for automatically controlling various height/pitch cylinders on a combine 10 when an operator requests a height adjustment for the cutter bar assembly 16. The method 102 in FIG. 4 illustrates how the system 60 may include partial serial and parallel actuation of two cylinders to achieve different header angles 30 and different cut heights 40 throughout the range automatically. The flow may be controlled between the two cylinders when in parallel to achieve the desired effect.

After determining the position of each of the cylinders (step 104), the system 60 waits to receive a height adjustment request from the operator (step 106). If the system 60 receives a height adjustment request from the operator, the system 60 determines whether the height adjustment request is a request to increase or decrease the crop cut height (step 108). If the request is to increase the crop cut height, the system 60 determines whether cylinder A is greater than a first position, e.g., 50% (step 110). If cylinder A is greater than the first position, then the system 60 retracts cylinder A (step 112) to increase the crop cut height and returns to step 106 to determine whether the operator continues to request a height adjustment. If cylinder A is not greater than the first position, then the system 60 determines whether cylinder B is less than its maximum position (step 114). If cylinder B is less than its maximum position, then the system 60 extends cylinder B (step 116) to increase the crop cut height. After extending cylinder B, the system 60 determines whether cylinder A is greater than its minimum position (step 118). The system 60 also determines whether cylinder A is greater than its minimum position (step 118) if cylinder B is not less than its maximum position at step 114. If cylinder A is greater than its minimum position, the system 60 retracts cylinder A (step 112) to increase the crop cut height and returns to step 106 to determine whether the operator continues to request a height adjustment. If cylinder A is not greater than its minimum position, the cutter bar assembly 16 has reached its maximum controlled cut height, and the system 60 returns to step 106 to await another height adjustment request from the operator.

If, at step 108, the request is to decrease the crop cut height, the system 60 determines whether cylinder B is greater than a second position, e.g., 75% (step 120). If cylinder B is greater the second position, the system 60 retracts cylinder B (step 122) to decrease the crop cut height and returns to step 106 to determine whether the operator continues to request a height adjustment. If cylinder B is not greater than the second position, the system 60 determines whether cylinder A is less than its maximum position (step 124). If cylinder A is less than its maximum position, then the system 60 extends cylinder A (step 126) to decrease the crop cut height. After extending cylinder A, the system 60 determines whether cylinder B is greater than its minimum position (step 128). The system 60 also determines whether cylinder B is greater than its minimum position (step 128) if cylinder A is not less than its maximum position at step 124. If cylinder B is greater than its minimum position, the system 60 retracts cylinder B (step 122) to decrease the crop cut height and returns to step 106 to determine whether the operator continues to request a height adjustment. If cylinder B is not greater than its minimum position, the cutter bar assembly 16 has reached its minimum controlled cut height, and the system 60 returns to step 106 to await another height adjustment request from the operator.

Figure 5:
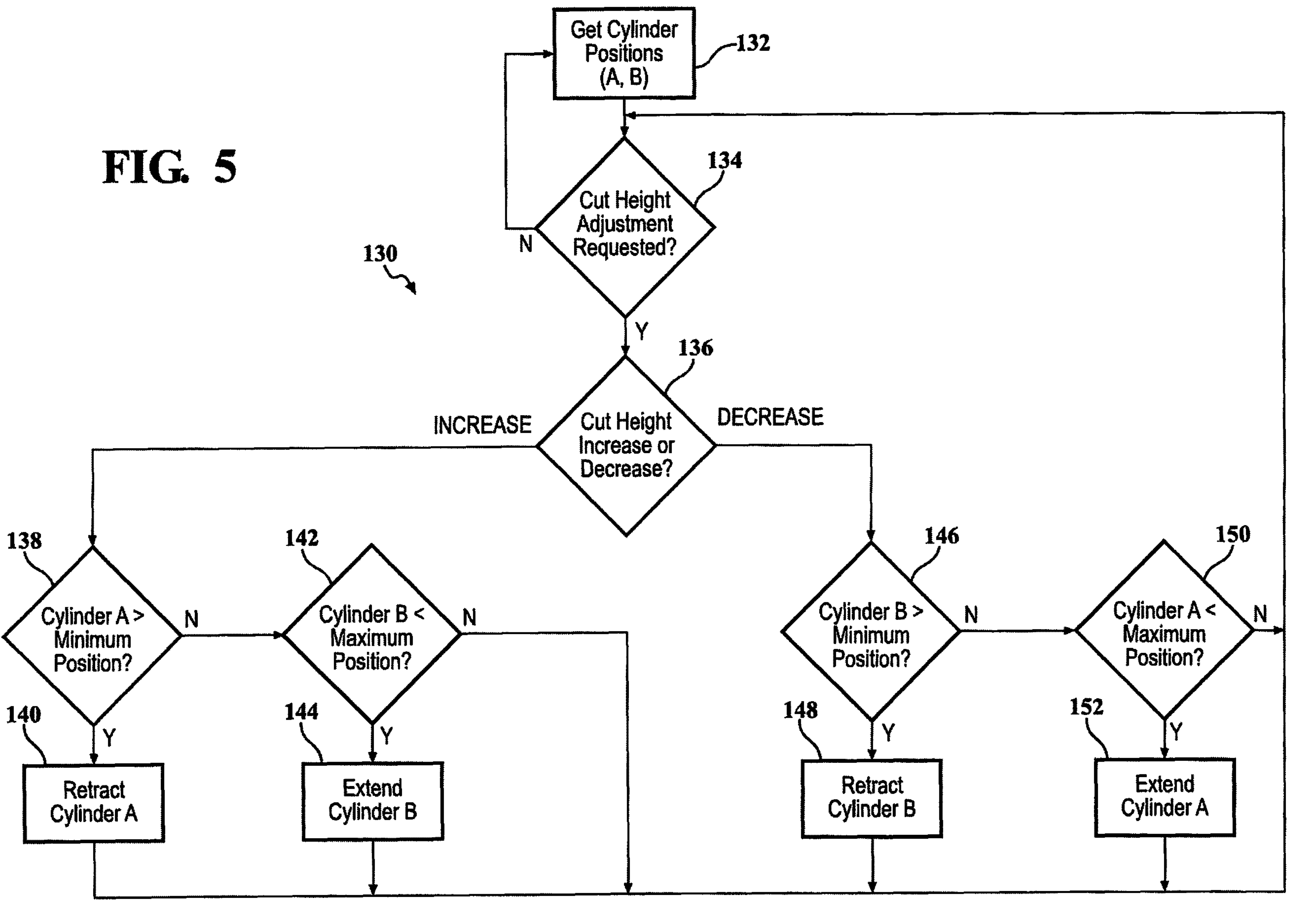
FIG. 5 is a flow diagram illustrating an exemplary method for controlling the header height and pitch on a combine harvester according to a third embodiment of the present invention.

FIG. 5 illustrates an exemplary method 130 performed by the system 60 in accordance with a third embodiment of the present invention for automatically controlling various height/pitch cylinders on a combine 10 when an operator requests a height adjustment for the cutter bar assembly 16. After determining the position of each of the cylinders (step 132), the system 60 waits to receive a height adjustment request from the operator (step 134). If the system 60 receives a height adjustment request from the operator, the system 60 determines whether the height adjustment request is a request to increase or decrease the crop cut height (step 136). If the request is to increase the crop cut height, the system 60 determines whether cylinder A is greater than its minimum position (step 138). If cylinder A is greater than its minimum position, the system 60 retracts cylinder A (step 140) to increase the crop cut height and returns to step 134 to determine whether the operator continues to request a height adjustment. If cylinder A is not greater than its minimum position, the system 60 determines whether cylinder B is less than its maximum position (step 142). If cylinder B is less than its maximum position, the system 60 extends cylinder B (step 144) to increase the crop cut height and returns to step 134 to determine whether the operator continues to request a height adjustment. If cylinder B is not less than its maximum position, the cutter bar assembly 16 has reached is maximum controlled cut height and the system 60 returns to step 134 to await another height adjustment request from the operator.

If, at step 136, the request is to decrease the crop cut height, the system 60 determines whether cylinder B is greater than its minimum position (step 146). If cylinder B is greater than its minimum position, the system 60 retracts cylinder B (step 148) to decrease the crop cut height and returns to step 134 to determine whether the operator continues to request a height adjustment. If cylinder B is not greater than its minimum position, the system 60 determines whether cylinder A is less than its maximum position (step 150). If cylinder A is less than its maximum position, then the system 60 extends cylinder A (step 152) to decrease the crop cut height and returns to step 134 to determine whether the operator continues to request a height adjustment. If cylinder A is not less than its maximum position, the cutter bar assembly 16 has reached its minimum controlled cut height, and the system 60 returns to step 134 to await another height adjustment request from the operator.

As discussed above, the method 130 in FIG. 5 uses the head tilt cylinder 28 and the gauge wheel cylinder 52 to raise and lower the cut height 40 of the cutter bar assembly 16. Using this method 130, when the header 12 is lowered to the ground 32, the head tilt cylinder 28 is fully extended and the gauge wheel cylinder 52 is fully retracted. At this point, the cutter bar assembly 16 will be resting on the ground 32 and the cut angle 30 will be at a maximum. This will allow the header 12 to cut at the minimum cut height 40 since the guard tips will be as close as possible to the ground surface 32.

If the operator wants a higher cut height 40, the tilt retract button is pressed on the control lever. This causes the header tilt cylinder 28 to retract, which reduces the cut angle 30 by tilting the header 12 back. The cutter bar assembly 16 is still resting on the ground 32, but the guard tips rotate upwards due to the change in the angle of the header 12. The operator may retract the header tilt cylinder 28 further, which will further increase the cut height 40 as the guard tips rotate upwards.

When the header tilt cylinder 28 is fully retracted and the operator continues to press the tilt retract button on the control lever, the system 60 begins to extend the gauge wheel cylinder 52, which forces the gauge wheels 44 down to start lifting the header 12. This will then lift the cutter bar assembly 16 off the ground 32, which increases the cut height 40. As the operator continues to press the tilt retract button, the header 12 continues to raise and increase cut height 40 until the gauge wheel cylinder 52 is fully extended and the header 12 has reached maximum controlled cut height 40.

If the operator desires to lower the cut height 40, he presses the tilt extend button on the control lever. Depending on where the cut height 40 is set, the gauge wheel cylinder 52 or the header tilt cylinder 28 will be adjusted to reduce the cut height 40. If the gauge wheel cylinder 52 is not fully retracted, it will be used to reduce the cut height 40. Otherwise, the header tilt cylinder 28 will be used.

Figure 6:
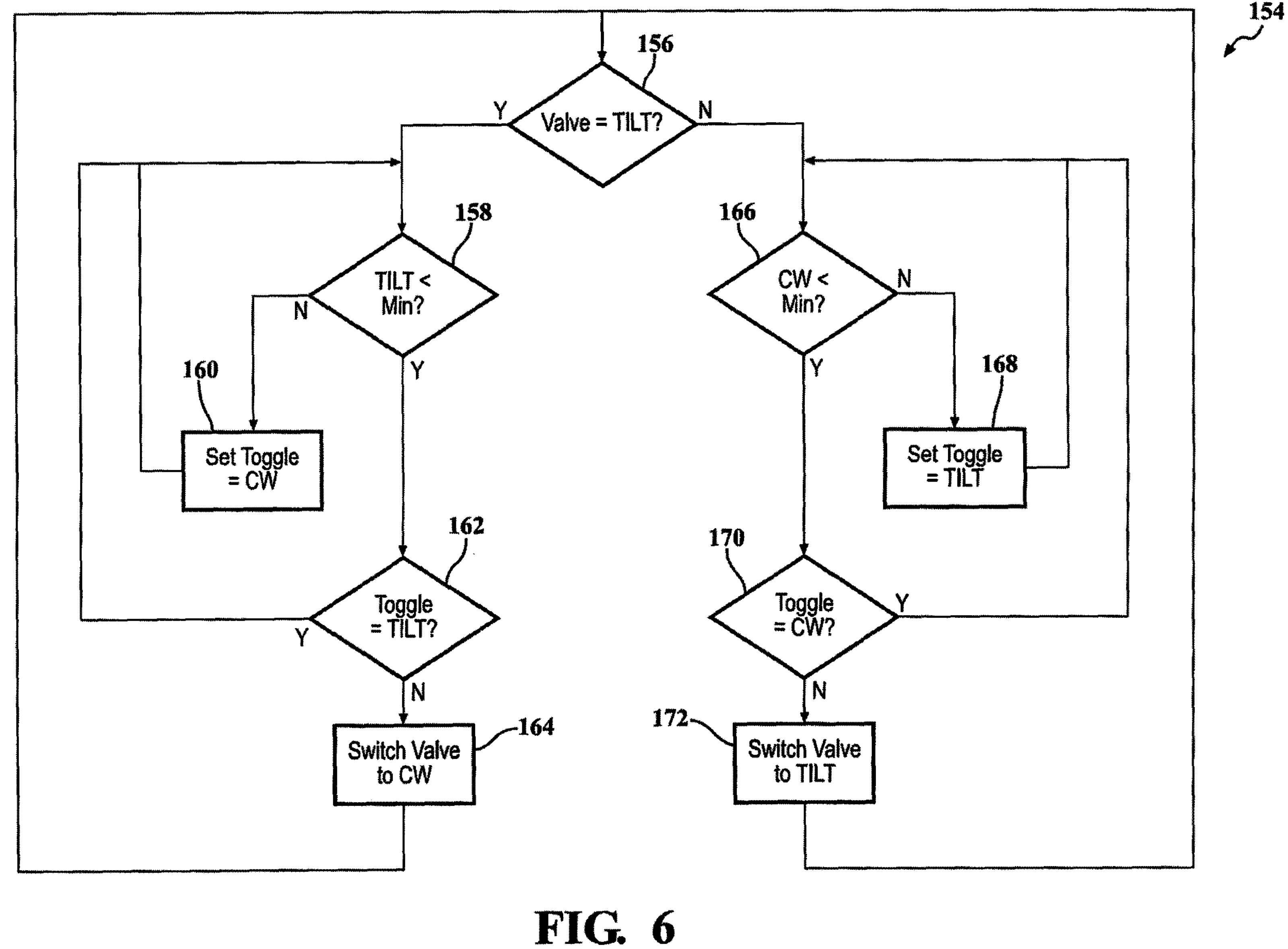
FIG. 6 is a flow diagram of an exemplary method for switching between cylinders when controlling the header height and pitch using the method of FIG. 5.

FIG. 6 illustrates an exemplary method 154 for switching between the head tilt cylinder 28 and the gauge wheel cylinder 52 when the method 130 of FIG. 5 is used to raise and lower the cut bar assembly 16. The system 60 uses two variables to determine when to switch between the cylinders 28, 52. “Valve” identifies the cylinder 28, 52 that currently is raising and/or lowering the cutter bar assembly 16, and “Toggle” identifies when to switch control between the cylinders 28, 52. Both Valve and Toggle default to TILT.

As reflected in FIG. 6, the system 60 initially determines which cylinder 28, 52 is being used to raise and lower the cutter bar assembly 16. If Valve=TILT (step 156), the head tilt cylinder 28 is being used to raise and lower the cutter bar assembly 16, and the system 60 follows the left side of the flow chart 154. Otherwise, the gauge wheel cylinder 52 is being used to raise and lower the cutter bar assembly 16, and the system 60 follows the right side of the flow chart 154.

If the head tilt cylinder 28 is being used to raise and lower the cutter bar assembly 16, the system 60 determines whether the position of the head tilt cylinder 28 is less than a minimum value (step 158). The minimum value is selected to ensure that the head tilt cylinder 28 is fully retracted. For example, the minimum value may be set at approximately 5%. If the position of the head tilt cylinder 28 is not less than a minimum value, the system 60 sets Toggle to CW (step 160), and continues to monitor the position of the head tilt cylinder 28 (step 158). The head tilt cylinder 28 will continue to raise and lower the header 12 until the head tilt cylinder 28 is fully retracted (i.e., when the position of the head tilt cylinder 28 becomes less than the minimum value). When the system 60 determines that the position of the head tilt cylinder 28 becomes less than the minimum value (step 158), the system 60 will determine whether Toggle is set to TILT (step 162). If Toggle is set to TILT, the system 60 will return to step 158 to monitor the position of the head tilt cylinder 28. If Toggle is not set to TILT, the system 60 will switch Valve to CW (step 164) to switch control of the cut height 40 to the gauge wheel cylinder 52. The system 60 will then return to step 156 to determine which cylinder 28, 52 is being used to raise and lower the cutter bar assembly 16.

If the gauge wheel cylinder 52 is being used to raise and lower the cutter bar assembly 16, the system 60 determines whether the position of the gauge wheel cylinder 52 is less than a minimum value (step 166). The minimum value is selected to ensure that the gauge wheel cylinder 52 is fully retracted. For example, the minimum value may be set at approximately 5%. If the position of the gauge wheel cylinder 52 is not less than a minimum value, the system 60 sets Toggle to TILT (step 168), and continues to monitor the position of the gauge wheel cylinder 52 (step 166). The gauge wheel cylinder 52 will continue to raise and lower the header 12 until the gauge wheel cylinder 52 is fully retracted (i.e., when the position of the gauge wheel cylinder 52 becomes less than the minimum value). When the system 60 determines that the position of the gauge wheel cylinder 52 becomes less than the minimum value (step 166), the system 60 will determine whether Toggle is set to CW (step 170). If Toggle is set to CW, the system 60 will return to step 166 to monitor the position of the gauge wheel cylinder 52. If Toggle is not set to CW, the system 60 will switch Valve to TILT (step 172) to switch control of the cut height 40 to the head tilt cylinder 28. The system 60 will then return to step 156 to determine which cylinder 28, 52 is being used to raise and lower the cutter bar assembly 16.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. A method for controlling header cut height on a combine, wherein the combine includes an adapter, a header pivotably mounted to the adapter, a cutter bar assembly operatively extending across a front portion of the header, and a gauge wheel pivotably coupled to the header, the method comprising the steps of:

receiving a request to adjust a height of the cutter bar assembly;

determining whether a position of a first cylinder is greater than a value;

if it is determined that the position of the first cylinder is greater than the value, using the first cylinder to adjust the height of the cutter bar assembly;

if it is determined that the position of the first cylinder is not greater than the value, determining whether a second position of a second cylinder is less than a second value; and if it is determined that the second position of the second cylinder is less than the second value, using the second cylinder to adjust the height of the cutter bar assembly.

2. The method of claim 1, wherein the value comprises a minimum position on the first cylinder.

3. The method of claim 2, wherein the second value comprises a maximum position on the second cylinder.

4. The method of claim 3, wherein if the request to adjust the height of the cutter bar assembly is a request to increase the height of the cutter bar assembly, the first cylinder is adapted to control a pitch angle of the header relative to the adapter.

5. The method of claim 4, wherein if the request to adjust the height of the cutter bar assembly is a request to increase the height of the cutter bar assembly, the second cylinder is adapted to extend and retract the gauge wheel.

6. The method of claim 3, wherein if the request to adjust the height of the cutter bar assembly is a request to decrease the height of the cutter bar assembly, the first cylinder is adapted to extend and retract the gauge wheel.

7. The method of claim 6, wherein if the request to adjust the height of the cutter bar assembly is a request to decrease the height of the cutter bar assembly, the second cylinder is adapted to control a pitch angle of the header relative to the adapter.

8. A system for controlling header cut height on a combine, wherein the combine includes an adapter, a header pivotably mounted to the adapter, a cutter bar assembly operatively extending across a front portion of the header, a gauge wheel pivotably coupled to the header, and a plurality of cylinders, wherein each of the plurality of cylinders is adapted to adjust a height of the cutter bar assembly, the system comprising:

a monitoring device;

a control unit adapted to extend and retract each of the plurality of cylinders; and a processor adapted to process information from the monitoring device and provide instructions to the control unit, wherein:

if the monitoring device receives a request to adjust the height of the cutter bar assembly, the processor determines whether a position of a first of the plurality of cylinders is greater than a value;

if the processor determines that the position of the first of the plurality of cylinders is greater than the value, the control unit uses the first of the plurality of cylinders to adjust the height of the cutter bar assembly;

if the processor determines that the position of the first of the plurality of cylinders is not greater than the value, the processor determines whether a second position of a second of the plurality of cylinders is less than a second value; and if the processor determines that the second position of the second of the plurality of cylinders is less than the second value, the control unit uses the second cylinder to adjust the height of the cutter bar assembly.

9. The system of claim 8, wherein the value comprises a minimum position on the first of the plurality of cylinders.

10. The system of claim 9, wherein the second value comprises a maximum position on the second of the plurality of cylinders.

11. The system of claim 10, wherein if the request to adjust the height of the cutter bar assembly is a request to increase the height of the cutter bar assembly, the first of the plurality of cylinders is adapted to control a pitch angle of the header relative to the adapter.

12. The system of claim 11, wherein if the request to adjust the height of the cutter bar assembly is a request to increase the height of the cutter bar assembly, the second of the plurality of cylinders is adapted to extend and retract the gauge wheel.

13. The system of claim 12, wherein if the request to adjust the height of the cutter bar assembly is a request to decrease the height of the cutter bar assembly, the first of the plurality of cylinders is adapted to extend and retract the gauge wheel.

14. The system of claim 13, wherein if the request to adjust the height of the cutter bar assembly is a request to decrease the height of the cutter bar assembly, the second of the plurality of cylinders is adapted to control a pitch angle of the header relative to the adapter.

15. A combine for harvesting agricultural crops comprising:

an adapter;

a header pivotably mounted to the adapter;

a cutter bar assembly operatively extending across a front portion of the header;

a gauge wheel pivotably coupled to the header;

a plurality of cylinders, wherein each of the plurality of cylinders is adapted to adjust a height of the cutter bar assembly; and a system for extending and retracting each of the plurality of cylinders, wherein:

if the system receives a request to adjust a height of the cutter bar assembly, the system determines whether a position of a first of the plurality of cylinders is greater than a value;

if the system determines that the position of the first of the plurality of cylinders is greater than the value, the system uses the first of the plurality of cylinders to adjust the height of the cutter bar assembly;

if the system determines that the position of the first of the plurality of cylinders is not greater than the value, the system determines whether a second position of a second of the plurality of cylinders is less than a second value; and if the system determines that the second position of the second of the plurality of cylinders is less than the second value, the system uses the second cylinder to adjust the height of the cutter bar assembly.

16. The combine of claim 15, wherein the value comprises a minimum position on the first of the plurality of cylinders.

17. The combine of claim 16, wherein the second value comprises a maximum position on the second of the plurality of cylinders.

18. The combine of claim 17, wherein if the request to adjust the height of the cutter bar assembly is a request to increase the height of the cutter bar assembly, the first of the plurality of cylinders is adapted to control a pitch angle of the header relative to the adapter.

19. The combine of claim 18, wherein if the request to adjust the height of the cutter bar assembly is a request to increase the height of the cutter bar assembly, the second of the plurality of cylinders is adapted to extend and retract the gauge wheel.

20. The combine of claim 19, wherein if the request to adjust the height of the cutter bar assembly is a request to decrease the height of the cutter bar assembly, the first of the plurality of cylinders is adapted to extend and retract the gauge wheel.

21. The combine of claim 20, wherein if the request to adjust the height of the cutter bar assembly is a request to decrease the height of the cutter bar assembly, the second of the plurality of cylinders is adapted to control a pitch angle of the header relative to the adapter.

* * * * *